May 23, 1933.                E. B. BAIN                1,910,784
                      AUTOMOBILE BURGLAR ALARM
                        Filed May 26, 1930
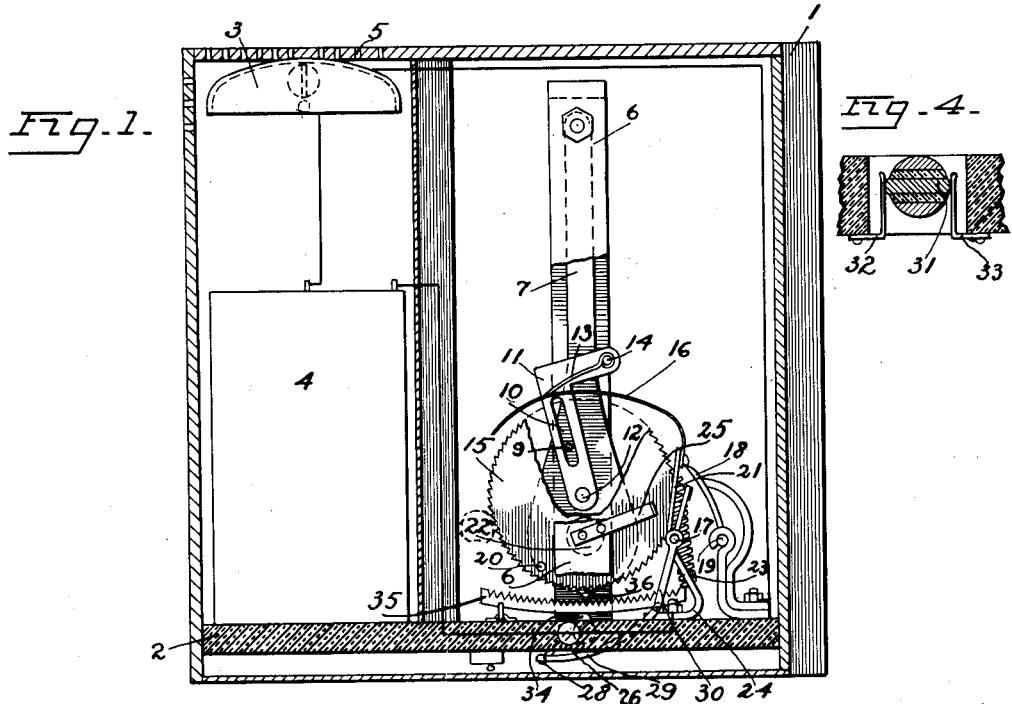
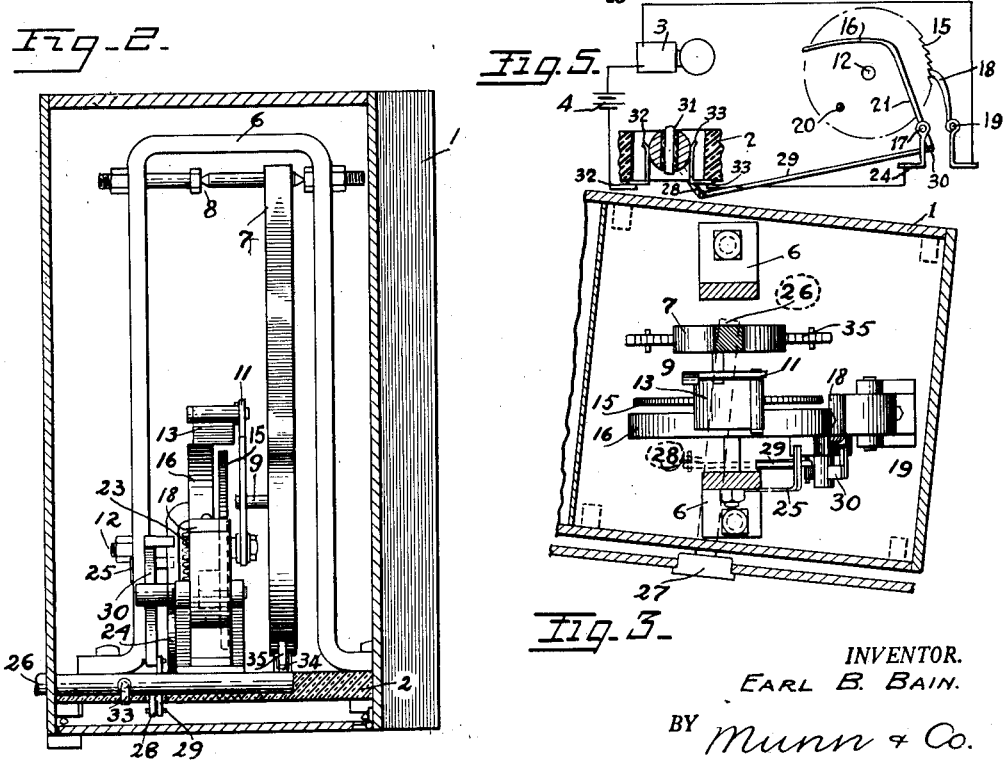
INVENTOR.
EARL B. BAIN.
BY Munn & Co.
ATTORNEYS.

Patented May 23, 1933

1,910,784

UNITED STATES PATENT OFFICE

EARL B. BAIN, OF SAN FRANCISCO, CALIFORNIA

AUTOMOBILE BURGLAR ALARM

Application filed May 26, 1930. Serial No. 455,659.

My invention relates to improvements in automobile burglar alarms, and it consists in the combinations, constructions and arrangements hereinafter described and claimed.

An object of my invention is to provide an automobile burglar alarm which is self-contained in a strong box and which has novel means actuated by the lateral swaying of the car for automatically closing a circuit to an audible alarm also disposed within the box. The box also contains the source of current used for sounding the alarm, and this source of current may be a dry cell or storage battery as the case may demand.

It is practically impossible to steal an automobile without causing it to sway when moving the automobile away. The mechanism provided for closing the switch is so constructed as to be actuated by a slight swaying movement. The alarm will be sounded before the car has proceeded an appreciable distance, and should the automobile be swayed excessively before starting to move, the alarm may be sounded before the car gets under way. The entire device is controlled by a key which is carried by the owner of the car.

Other objects and advantages will appear as the specification proceeds, and the novel features of the device will be particularly pointed out in the claims hereto annexed.

My invention is illustrated in the accompanying drawing, in which:

Figure 1 is a transverse section through the device showing most of the parts in elevation, Figure 2 is a side elevation of the mechanism, Figure 3 is a top sectional view, Figure 4 is a detail sectional view, and Figure 5 is a wiring diagram.

In carrying out my invention I provide a strong box 1 that is provided with a bottom 2 which may be removed from the box for gaining access to the contents thereof. The box is preferably disposed beneath the cowl of the automobile where it may be hidden from view by the instrument board. Within the box I dispose a sound-producing mechanism such as a bell 3 and a source of current such as a dry cell or storage battery 4. Openings 5 are provided in the box to permit the sound waves emitted by the bell to pass through the box.

The mechanism for automatically closing the circuit to the bell will now be described. In Figure 2 I show a U-shaped member 6 that is inverted and supported by the platform 2. A pendulum 7 is pivotally carried at the upper end of the member 6 as shown at 8, and is sensitively mounted so as to easily sway when the body of the car is gently rocked as when a person enters the car or when the car moves over a smooth pavement.

The pendulum 7 carries a pin 9 (see Figure 2), and this pin is slidably received in a slot 10 (see Figure 1) of a member 11. The member 11 is rotatably mounted upon a stub shaft 12, and it will be seen that a swinging of the pendulum will cause the member 11 to oscillate about the shaft 12 as a pivot.

Still referring to Figure 1, it will be seen that the member 11 carries a pawl 13 that is pivoted at 14 so as to drop by gravity upon a ratchet 15 or upon a movable supporting member 16. When the supporting member is swung to the left in Figure 1 about its pivot 17 by a means hereinafter described, the support will be disposed below the upper portion of the ratchet 15. The pawl 13 will therefore ride upon the teeth of the ratchet. If, now, a swinging motion is imparted to the pendulum 7, the pawl 13 will be reciprocated with respect to the ratchet 15, and the teeth of the ratchet are so arranged that a movement of the pawl to the left in Figure 1 will rotate the ratchet in a counter-clockwise direction about the shaft 12, while a movement to the right will cause the pawl to ride over the teeth. The ratchet is prevented from rotating to the right by a pawl 18 (see Figure 1) pivoted at 19 and swingable into engagement with the teeth of the ratchet when the support 16 is swung to the left about the pivot 17.

Each slight swaying of the car will cause the pendulum to swing, and the pendulum in turn will gradually rotate at ratchet in a counter-clockwise direction. This movement will continue until a projection 20 carried by the ratchet will contact with the portion 21 of the support 16 and will swing it to the right for raising the portion into the position shown in Figure 1. The portion 21 forms one terminal of an electric circuit connecting the battery 4 with the bell 3, and the striking of this portion upon the pawl 18 will not only free the pawl from the ratchet but will close the circuit to the bell, because the pawl acts as the other terminal of the switch. The bell will now start to sound and will quickly indicate to passersby that the car is being tampered with. The bell will continue to sound until the true owner comes along and breaks the circuit. Before describing how this is done, it is best to continue with the structure and operation of the device.

The ratchet 15 carries a weight 22 that is designed to swing the ratchet into the position shown when both pawls 13 and 18 are removed from the ratchet. This will dispose the projection 20 in the position shown, and the device will now be ready to operate the next time the support 16 is lowered and the contacts 21 and 18 are freed from each other.

The support 16 is held in either of its two positions by a spring 23. The part 21 extends at an angle with respect to its supporting member 24, and the spring 23 tends to hold these parts in the position shown. When, now, the support 16 is swung to the left beyond dead center with respect to the support 24, the spring 23 will be disposed on the opposite side of the pivot point 17 and will tend to hold the support in its lowermost position. A stop 25 is carried by one leg of the support 6 and limits the swinging of the part 21 to the left in Figure 1.

The member 16 is moved into either of its two positions by means of a key-controlled member, and this key-controlled member also actuates a second switch in series with the bell circuit so as to prevent the alarm from sounding when the true owner is driving the car. All of the figures show a rod 26 that is designed to be rocked when a key is inserted in a lock 27 (see Figure 3) and is turned. It is impossible to rock the rod 26 without the proper key. The rod or shaft 26 carries an arm 28 (see Figure 1), and a link 29 connects this arm with an arm 30 that in turn is rigidly connected to the support 16 and the part 21. It will be seen from this construction that a turning movement of the rod 26 to the left will cause the support 16 to drop below the ratchet 15 and to permit the pawls 13 and 18 to engage with the ratchet. The same movement of the rod will swing a conductor 31 (see Figure 4) into a position to close a circuit through terminals 32 and 33 that form a part of the circuit to the bell. The bell will not sound at this moment because the switch formed by the parts 21 and 18 is open. A swaying of the car will, however, soon move the support 16 so as to close the second switch and to sound the alarm.

It is desirous to prevent the pendulum from swinging unnecessarily when the device is not being used. To accomplish this, I provide a cam 34 on the rod 26, and this cam will raise a rack 35 (see Figure 1) into a position where it will engage with a point 36 carried by the pendulum 7. The rack is long enough to engage with the pendulum throughout its entire swing, and the pendulum will be prevented from operating.

It should be noted that the front and back walls of the box are disposed transversely to the automobile when securing the box in place. This will cause the support 6 to extend at a slight angle with respect to the length of the automobile, and the axis of the pendulum will extend at the same angle. I have found that this results in practically no movement of the pendulum when the car is jostled from the front or back by another car. It will not prevent movement, however, of the pendulum when a person steps into the car and also when the car is swayed slightly during actual movement. The purpose of this annular positioning of the axis of the pendulum is to prevent the accidental closing of the alarm circuit when the car is jostled in the manner described.

From the foregoing description of the various parts of the device, the operation thereof may be readily understood.

The parts are normally disposed in the position shown in Figure 1, and the conductor 31 shown in Figure 4 is normally disposed at right angles to that shown. When the driver wishes to leave his car, he inserts the key in the lock 27 and turns the lock for rotating the rod or shaft 26. This will close the contact points 32 and 33 shown in Figure 4, will lower the rack 35, and will swing the support 16 into a position where the pawls 13 and 18 will engage with the ratchet 15. A slight swaying of the car laterally caused by any movement will start the pendulum 7 to swinging, and this will gradually bring the projection 20 into a position where it will close the terminals 21 and 18 and sound the alarm. The alarm will inform everyone that the car is being tampered with in the act of stealing. The alarm can only be turned off by using the correct key in the lock 27.

The contact 33 is clearly shown in Figure 4 and as engaging a pin 31 that extends through the rod 26. The wiring is shown diagrammatically in Figure 1 and the rod 26 is shown as being imbedded in the insulating bottom 2 and a wire leading from the battery 4 passes along the insulating bottom 2 and through the rod 26. Of course the portion of the wire passing through the rod 26 is in reality the conducting pin 31, as shown in the wiring diagram in Figure 5.

Although I have shown and described one embodiment of my invention, it is to be understood that the same is susceptible of various changes, and I reserve the right to employ such changes as may come within the scope of the claims hereto annexed.

I claim:

1. An automobile burglar alarm comprising a pendulum actuated when the automobile is swayed laterally, a ratchet, a pawl carried by said pendulum for intermittently rotating said ratchet during the swinging of the pendulum, a switch, a pin carried by the ratchet for closing the switch after the ratchet has moved through a predetermined distance, means actuated by the closing of the switch for disengaging said pawl from said ratchet and a key-controlled switch in series with the first switch.

2. An automobile burglar alarm comprising a pendulum actuated when the automobile is swayed laterally, a ratchet, a pawl carried by said pendulum for intermittently rotating said ratchet during the swinging of the pendulum, a switch, a pin carried by the ratchet for closing the switch after the ratchet has moved through a predetermined distance, means actuated by the closing of the switch for disengaging said pawl from said ratchet, means for returning said ratchet to normal position upon the closing of the switch and a key-controlled switch in series with the first switch.

3. An automobile burglar alarm comprising a pendulum actuated upon the lateral swaying of an automobile, a ratchet, a pawl carried by the pendulum and engaging with the ratchet, a key-operated member for freeing the pawl from the ratchet, means carried by the ratchet for automatically actuating said member when the ratchet has been moved through a predetermined distance, said member when freeing the ratchet, closing a switch, and a key-controlled switch in series with the first switch, said key-controlled switch when closed opening the first switch.

4. An automobile burglar alarm comprising a pendulum actuated upon the lateral swaying of an automobile, a ratchet, a pawl carried by the pendulum and engaging with the ratchet, a key-operated member for freeing the pawl from the ratchet, means carried by the ratchet for automatically actuating said member when the ratchet has been moved through a predetermined distance, said member when freeing the ratchet, closing a switch, a key-controlled switch in series with the first switch, said key-controlled switch when closed opening the first switch, and means actuated by the key-controlled switch for holding the pendulum against movement when the key-controlled switch is opened.

5. A self-contained burglar alarm designed to be set off when moved and comprising a casing, a pendulum pivotally disposed within the casing, and oscillated when the casing is moved, a ratchet, a pawl actuated by the pendulum for step-wise advancing the ratchet, a key operated switch, a second switch in series with the first and including a movable arm, a pin carried by the ratchet for moving the arm and closing the switch, a warning signal and source of current disposed within the casing, said second named switch when closed by the pin electrically connecting the signal to the source of current and to the first switch.

6. A self-contained burglar alarm designed to be set off when moved and comprising a casing, a pendulum pivotally disposed within the casing, and oscillated when the casing is moved, a ratchet, a pawl actuated by the pendulum for step-wise advancing the ratchet, a key operated switch, a second switch in series with the first and including a movable arm, a pin carried by the ratchet for moving the arm and closing the switch, a warning signal and source of current disposed within the casing, said second named switch when closed by the pin electrically connecting the signal to the source of current and to the first switch, said arm when closing the switch freeing the pawl from the ratchet for permitting the pendulum to freely swing without affecting the ratchet.

7. A self-contained burglar alarm designed to be set off when moved and comprising a casing, a pendulum pivotally disposed within the casing, and oscillated when the casing is moved, a ratchet, a pawl actuated by the pendulum for step-wise advancing the ratchet, a key operated switch, a second switch in series with the first and including a movable arm, a pin carried by the ratchet for moving the arm and closing the switch, a warning signal and source of current disposed within the casing, said second named switch when closed by the pin electrically connecting the signal to the source of current and to the first switch, said arm when closing the switch freeing the pawl from the ratchet for permitting the pendulum to freely swing without affecting the ratchet, said ratchet having a weight for returning the ratchet to starting position upon the release of the pawl.

8. In combination, a pendulum, a ratchet, a pawl moved by the pendulum and engaging with the ratchet, a switch arm swingable into two positions and having a portion for holding the pawl out of engagement with the ratchet when the arm is in closed position, a pin carried by the ratchet for swinging the arm into closed position, and a weight secured to the ratchet for returning it to starting position when the arm frees the pawl.

9. In combination, a pendulum, a ratchet, a pawl moved by the pendulum and engaging with the ratchet, a switch arm swingable into two positions and having a portion for holding the pawl out of engagement with the ratchet when the arm is in closed position, a pin carried by the ratchet for swinging the arm into closed position, and a weight secured to the ratchet for returning it to starting position when the arm frees the pawl, a second pawl engageable with the ratchet and constituting the other arm of the switch, said first named switch arm when moved into closed position, contacting with the second pawl and removing it from the ratchet.

10. In combination, a pendulum, a ratchet, a pawl moved by the pendulum and engaging with the ratchet, a switch arm swingable into two positions and having a portion for holding the pawl out of engagement with the ratchet when the arm is in closed position, a pin carried by the ratchet for swinging the arm into closed position, and a weight secured to the ratchet for returning it to starting position when the arm frees the pawl, key controlled and manually actuated means for moving the switch arm into either position, and a stop connected with said means and movable into engagement with the pendulum when said means moves the switch arm into closed position, whereby the pendulum is held against movement.

11. In combination, a pendulum, a ratchet, a pawl moved by the pendulum and engaging with the ratchet, a switch arm swingable into two positions and having a portion for holding the pawl out of engagement with the ratchet when the arm is in closed position, a pin carried by the ratchet for swinging the arm into closed position, and a weight secured to the ratchet for returning it to starting position when the arm frees the pawl, key controlled and manually actuated means for moving the switch arm into either position, and a stop connected with said means and movable into engagement with the pendulum when said means moves the switch arm into closed position, whereby the pendulum is held against movement, and a second switch in series with the first switch arm and with a warning signal for opening the circuit between the signal and a source of current when the first switch arm is closed by said means.

Signed at San Francisco in the county of San Francisco and State of California this 19th day of May A. D. 1930.

EARL B. BAIN.